Oct. 25, 1949.     D. F. CHRISTOFFER     2,485,703
LIVESTOCK TOOL
Filed June 23, 1947     2 Sheets-Sheet 1
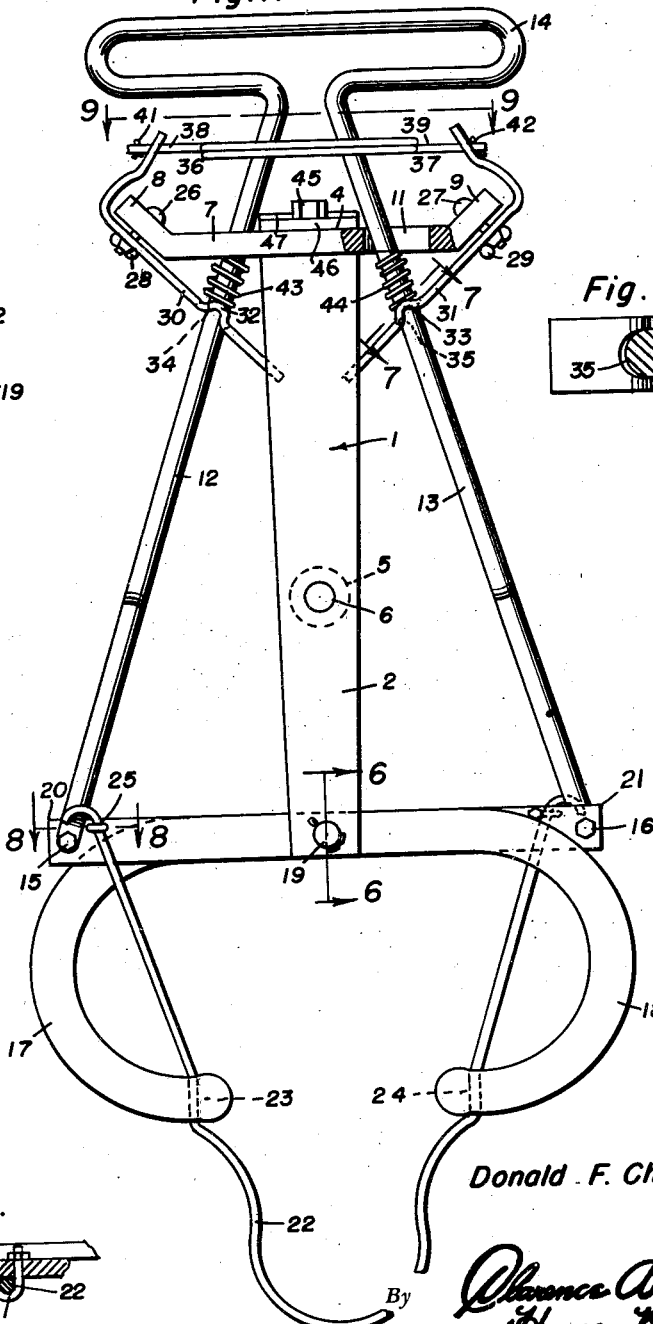
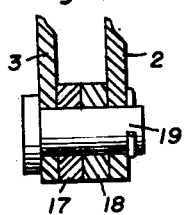
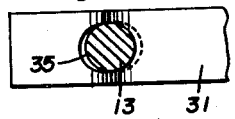
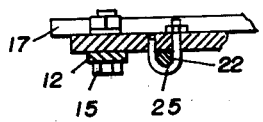
Inventor
Donald F. Christoffer
By Clarence A. O'Brien
and Harvey B. Jackson
Attorneys Oct. 25, 1949.  D. F. CHRISTOFFER  2,485,703
LIVESTOCK TOOL
Filed June 23, 1947  2 Sheets-Sheet 2
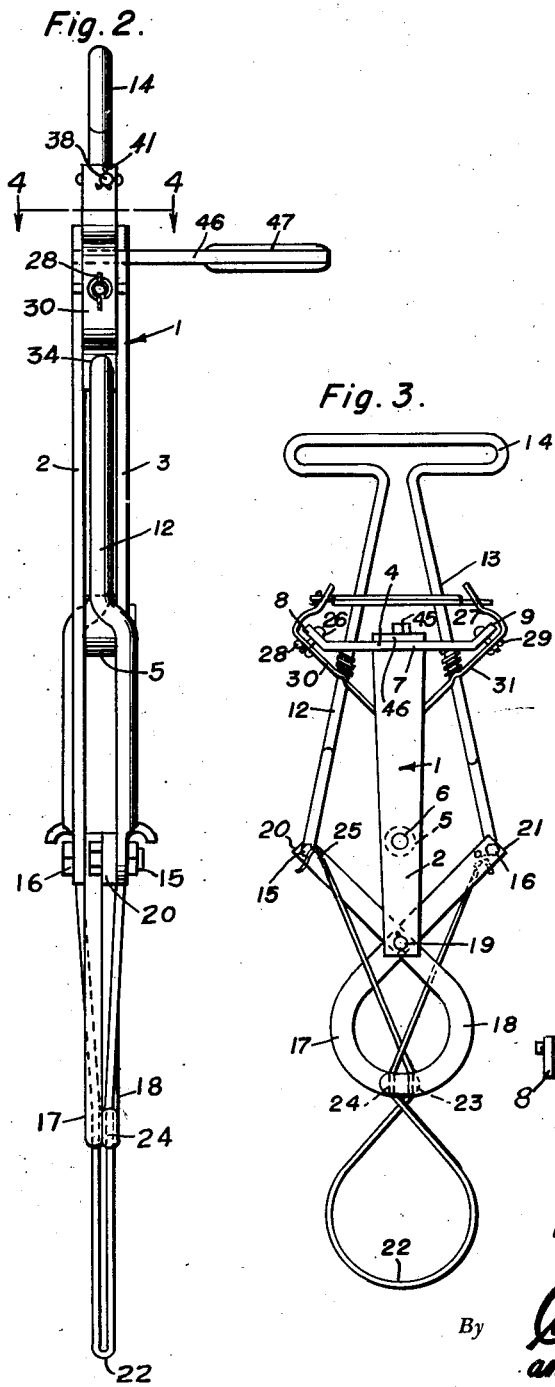
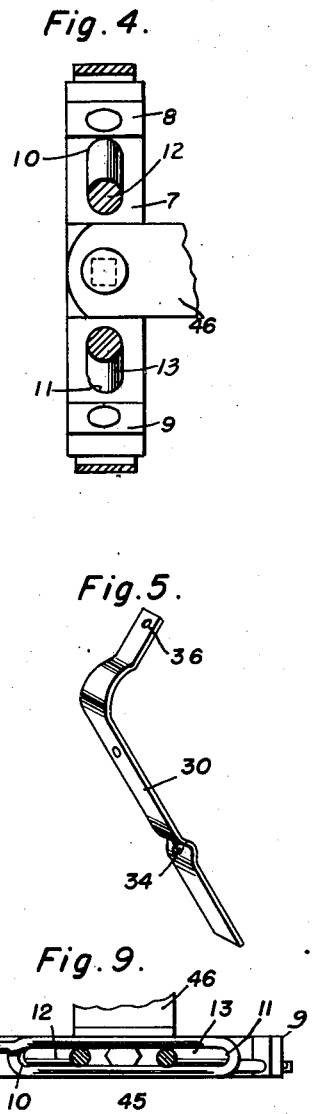
Inventor
Donald F. Christoffer Patented Oct. 25, 1949

2,485,703

UNITED STATES PATENT OFFICE 2,485,703

LIVESTOCK TOOL

Donald F. Christoffer, Spirit Lake, Iowa

Application June 23, 1947, Serial No. 756,507

7 Claims. (Cl. 119—153)

This invention relates to improvements in livestock tools.

An object of the invention is to provide an improved livestock tool used for catching and holding livestock.

Another object of the invention is to provide an improved livestock tool including a body having clamp arms pivoted on the lower end thereof adapted to support a cable loop, together with a handle operatively connected with said clamp arms for automatically moving said clamp arms to tighten the cable loop about the snout of the stock when caught, and said loop being removable so that the tool may be used as a bull stop or cattle leader by engaging the clamp arms in the nostrils of the animal or in a ring already in the animal's nose.

A further object of the invention is to provide an improved livestock tool including a body having clamp arms pivoted on the lower end thereof adapted to support a cable loop for placing over the snout of stock, together with a handle and lock mechanism operatively connected with said clamp arms for automatically moving said clamp arms to tighten the cable loop about the snout of stock when caught, and a release mechanism for releasing the lock mechanism upon being tripped, whereby the cable loop will be opened to release the stock.

Another object of the invention is to provide an improved form of livestock tool comprising a body and a pair of pivoted clamp arms on the lower end thereof for detachably supporting a cable loop, and adjustably tensioned lock means for securing said cable loop about the snout of stock when caught, and trip release means for releasing the tension on said lock means for releasing said cable loop from the stock.

A further object of the invention is to provide an improved livestock tool which will be highly efficient in operation, and relatively inexpensive to manufacture and produce.

Other objects will appear as the description proceeds.

In the accompanying drawings which form a part of this application,

Figure 1 is a front elevation of the improved livestock catching and holding tool shown in open position;

Figure 2 is an edge view of the improved livestock catching and holding tool;

Figure 3 is a front elevation of the improved livestock catching and holding tool shown in closed position;

Figure 4 is a sectional view taken on the line 4—4 of Figure 2;

Figure 5 is a perspective view of one of the adjustable lock members;

Figure 6 is a sectional view taken on the line 6—6 of Figure 1;

Figure 7 is a sectional view taken on the line 7—7 of Figure 1;

Figure 8 is a sectional view taken on the line 8—8 of Figure 1; and

Figure 9 is a sectional view taken on the line 9—9 of Figure 1.

Like characters of reference are used throughout the following specification and the accompanying drawings to designate corresponding parts.

In carrying out the invention, there is provided an improved livestock tool used for catching and holding the stock, including an inverted, U-shape body member generally designated by the reference numeral 1 having parallel spaced, depending arms 2 and 3, and a connecting head portion 4 between the upper ends of said arms. A tubular reinforcing brace 5 will be secured between the side arms 2 and 3 of the body 1 by means of the cross extending rivet 6.

A transversely extending guide bar or plate 7 will be supported at the upper end of the tool body 1, and will be formed with upwardly and outwardly angled terminal end portions 8 and 9, and elongated slots 10 and 11 are formed through the plate 7 adjacent its ends 8 and 9 to slidably receive the downwardly and outwardly extending rods or arms 12 and 13 of the operating handle 14 which is looped to provide for the easy grasping of the same.

The lower ends of said rods or arms 12 and 13 of the handle 14 are slightly offset, as clearly illustrated in Figure 2 of the drawings, and are apertured at their extreme lower ends to receive the bolts 15 and 16, respectively.

A pair of crossed arcuate clamp arms 17 and 18 are pivotally mounted upon the bolt 19 extending between the lower ends of the side arms 2 and 3 of the tool body 1, and have their upper or outer straight ends 20 and 21 pivotally mounted upon the bolts 15 and 16, for providing a toggle like operation of the clamp arms 17 and 18 when the handle 14 is moved upwardly with respect to the tool body 1 which will be used as a bull stop or cattle leader, or for clamping about the leg of a hog.

A cable loop 22 is extended through apertures 23 and 24 formed in the lower ends of the arcuate clamp arms 17 and 18, and extend upwardly to be clamped or anchored to the sides of the opposite straight end portions of said clamp arms, by means of the U-shape hook fasteners 25, clearly shown in Figure 8 of the drawings.

The outer angled terminal end portions 8 and 9 of the guide bar or plate 7 are apertured to receive the bolts 26 and 27 with wing nuts 28 and 29, for adjustably tensioning and supporting the substantially L-shape lock members 30 and 31 which are formed with the arcuate bearing portions 32 and 33, through which the elongated slots 34 and 35 are formed to permit the operating rods or arms 12 and 13 to freely slide through.

The inner or lower ends of the lock members 30 and 31 will extend between the spaced side arms 2 and 3 of the tool body, and the upwardly and inwardly bent upper ends of the lock members 30 and 31 are apertured at 36 and 37 to receive the oppositely extending, offset release pins 38 and 39 which are looped about the operating arms 12 and 13 of said operating handle 14. Cotter pins or keys 41 and 42 will be placed through suitable apertures in the outer ends of the release pins 38 and 39 to retain the same in operative position.

Coil springs 43 and 44 will be disposed about the operating arms 12 and 13 between the guide bar or plate 7 and the arcuate bearing portions 32 and 33 for variably and adjustably tensioning said lock members 30 and 31 by tightening or loosening the wing nuts 28 and 29 on the bolts 26 and 27.

A securing bolt 45 will extend through the guide plate 7 and head portion 4 of the tool body 1, and through the laterally extending shank 46 of a supporting handle 47 which is used for holding the tool while applying the same to the nose of the stock being caught.

In operation, the handle 14 is grasped in one hand and the supporting handle 47 is held in the other hand, and the operating handle 14 forced downwardly to open the clamps 17 and 18 and the cable loop 22 supported thereby. The cable loop will then be placed over the snout of the livestock, and by pulling upwardly on the operating handle 14, the arcuate clamp arms 17 and 18 will function as a toggle to pull up tightly upon the cable loop 22 after the same has been placed over the snout of the stock, thus firmly holding the animal.

The upward pull upon the operating handle 14 will move the operating arms 12 and 13 formed integrally therewith in an upward manner to slide through the lock members 30 and 31, and the tension and action of the coil springs 43 and 44 disposed about said arms or rods 12 and 13 will cause the lock members to firmly support the rods in their retracted position, since the lock members 30 and 31 are anchored by means of the bolts 26 and 27 and wing nuts 28 and 29 to the guide plate 7 fixed to the upper end of the body 1 of the tool.

When it is desired to release the animal, it is only necessary to move the release pins with respect to the operating rods 12 and 13, and said release pins being connected to the upper angled extensions of the lock members 30 and 31 will cause the same to pivot upon the bolts 26 and 27 to force the arcuate portions 32 and 33 of said lock members to compress the springs 43 and 44 to permit the operating rods 12 and 13 to move downwardly, thereby opening the clamp arms 17 and 18 and opening and releasing the cable loop 22 from the nose of the animal which had been caught.

By varying the adjustment of the wing nuts 28 and 29 upon the bolts 26 and 27, the adjustment upon the coil springs 43 and 44 may be varied as desired to secure the desired tension of the locking members upon said operating rods 12 and 13.

From the foregoing description, it will be seen that there has been devised and provided a highly efficient form of livestock tool used for catching and securing livestock, the same being relatively inexpensive to manufacture and produce, inasmuch as several of the parts thereof are interchangeable for use on either the right or the left side of said tool, and said tool may be used either with or without the loop being attached to it.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A tool for catching and holding livestock including an inverted U-shape body having depending spaced arms with lower ends, a pivot bolt extending between the lower ends of said arms, crossed arcuate clamp arms having upper and lower ends and pivotally mounted on said depending arms, said crossed arcuate clamp arms being pivotally mounted on said pivot bolt, a detachable cable loop with ends and slidable through the lower ends of said arcuate clamp arms said cable loop having its ends secured to the upper ends of the clamp arms, a supporting handle attached to said body, and a looped operating handle slidably supported on said body having depending operating rods connected with the upper ends of said clamp arms for selectively closing and opening said cable loop.

2. A tool for catching and holding livestock including an inverted U-shape body having depending spaced arms with lower ends, a pivot bolt extending between the lower ends of said arms, crossed arcuate clamp arms having upper and lower ends and pivotally mounted on said pivot bolt, a cable loop with ends, said loop being slidable through the lower ends of said arcuate clamp arms said loop having its ends secured to the upper ends of the clamp arms, a supporting handle attached to said body, a looped operating handle slidably supported on said body having depending operating rods connected with the upper ends of said clamp arms for selectively closing and opening said cable loop, and an apertured guide plate supported on said body for receiving said operating rods for guiding said rods during the operation of same.

3. A tool for catching and holding livestock including an inverted U-shaped body having depending spaced arms with lower ends, a pivot bolt extending between the lower ends of said arms, crossed arcuate clamp arms having upper and lower ends and pivotally mounted on said pivot bolt, a cable loop with ends, said loops being slidable through the lower ends of said arcuate clamp arms, said loop having its ends secured to the upper ends of the clamp arms, a supporting handle attached to said body, a looped operating handle slidably supported on said body having depending operating rods connected with the upper ends of said clamp arms for selectively closing and opening said cable loop, an apertured guide plate supported on said body for receiving said operating rods for guiding said rods during the operation of the same, and pivoted lock members supported on said guide plate engageable with said operating rods for securing the same in set position.

4. A tool for catching and holding livestock including an inverted U-shaped body having depending spaced arms with lower ends, reinforcing means disposed between said arms, a pivot bolt extending between the lower ends of said arms, crossed arcuate clamp arms having upper and lower ends and pivotally mounted on said pivot bolt, a cable loop with ends, said loop being slidable through the lower ends of said arcuate clamp arms and having its ends secured to the upper ends of the clamp arms, a supporting handle attached to said body, a looped operating handle slidably supported on the body having depending operating rods connected with the upper ends of said clamp arms for selectively closing and opening said cable loop, an apertured guide plate supported on said body for receiving said operating rods for guiding said rods during the operation of the same, pivoted lock members supported on said guide plate engageable with said operating rods for securing the same when in set position, and adjustable resilient means for varying the action of said locking means upon said operating rods.

5. A tool for catching and holding livestock including an inverted U-shape body having depending spaced arms with lower ends, reinforced bracing means connected between said arms, a pivot bolt extending between the lower ends of said arms, crossed arcuate clamp arms having upper and lower ends and pivotally mounted on said pivot bolt, a cable loop with ends, said loop being slidable through the lower ends of said arcuate clamp arms and having its ends secured to the upper ends of the clamp arms, a supporting handle attached to said body, a looped operating handle slidably supported on said body having depending operating rods connected with the upper ends of said clamp arms for selectively closing and opening said cable loop, an apertured guide plate supported on said body for slidably receiving said operating rods while guiding the rods during the operation of the same, pivoted lock members supported on said guide plate engageable with said operating rods for securing the same when in set position, resilient tensioning means for said locking members, and means for adjustably varying the action of said tensioning means to vary the locking effect of said locking members upon said operating rods.

6. The subject matter as claimed in claim 5, and lock-releasing pins supported by said operating rods and engageable with said lock members for tripping the same to release said operating rods for releasing and opening said cable loop.

7. A tool for holding livestock comprising a body having depending spaced arms with lower ends, crossed arcuate clamp arms having upper and lower ends, means carried by said spaced arms adjacent the lower ends thereof pivotally mounting said crossed arcuate clamp arms on said depending spaced arms, a flexible member forming a loop with ends, said flexible member being slidable through the lower ends of said arcuate clamp arms and the ends of said loop being secured to the upper ends of said clamp arms, a supporting handle fixed to said body and an operating handle slidably disposed on said body with means operatively connected therewith and the upper ends of said clamp arms for selectively opening and closing said loop.

DONALD F. CHRISTOFFER.

REFERENCES CITED

The following references are of record in the file of this patent:

UNITED STATES PATENTS

| Number | Name | Date |
| --- | --- | --- |
| 89,922 | Fasig | May 11, 1869 |
| 247,671 | McKeever | Sept. 27, 1881 |
| 1,201,560 | Conn, Jr. | Oct. 17, 1916 |